(12) United States Patent
Lee

(10) Patent No.: US 7,872,386 B2
(45) Date of Patent: Jan. 18, 2011

(54) MOTOR

(75) Inventor: Ho Jae Lee, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/713,048

(22) Filed: Mar. 2, 2007

(65) Prior Publication Data

US 2008/0136287 A1 Jun. 12, 2008

(30) Foreign Application Priority Data

| Dec. 6, 2006 | (KR) | ................ 10-2006-0122998 |
| Dec. 6, 2006 | (KR) | ................ 10-2006-0122999 |
| Dec. 6, 2006 | (KR) | ................ 10-2006-0123000 |
| Dec. 6, 2006 | (KR) | ................ 10-2006-0123001 |

(51) Int. Cl.
*H02K 5/00* (2006.01)
*H02K 11/00* (2006.01)

(52) U.S. Cl. .................. 310/89; 310/68 R; 310/71; 310/91; 310/156.01; 310/216.001; 310/269

(58) Field of Classification Search ............... 310/254, 310/216, 156, 218, 68 R, 89, 217, 269, 71, 310/91; *H02K 5/00, 11/00*
See application file for complete search history.

(56) References Cited

U.S. PATENT DOCUMENTS

| 2,172,191 | A | * | 9/1939 | Denman ................ 310/259 |
| 2,251,674 | A | * | 8/1941 | Gillen ................. 310/172 |
| 3,041,487 | A | * | 6/1962 | Hurst .................. 310/172 |
| 3,749,956 | A | * | 7/1973 | Reiss .................. 310/216 |
| 5,126,613 | A | * | 6/1992 | Choi ................... 310/208 |
| 5,670,836 | A | * | 9/1997 | Horst .................. 310/156.15 |
| 6,023,117 | A |   | 2/2000 | Chen |
| 6,050,785 | A | * | 4/2000 | Horng ................. 417/354 |
| 6,131,268 | A | * | 10/2000 | Neuenschwander ........ 29/596 |
| 6,169,345 | B1 |   | 1/2001 | Bloch et al. |
| 6,225,715 | B1 |   | 5/2001 | Hoda et al. |
| 6,400,053 | B1 |   | 6/2002 | Horng et al. |
| 6,483,209 | B1 |   | 11/2002 | Horng et al. |

(Continued)

FOREIGN PATENT DOCUMENTS

CN 1492564 4/2004

(Continued)

OTHER PUBLICATIONS

Weizi Wang; Zhigan Wu; Wanbing Jin; Jianping Ying, "Starting methods for hall-less single phase BLDC motor", Industrial Electronics Society, 2005. IECON 2005. 32nd Annual Conference of IEEE Nov. 6-10, 2005 p. 5 pp.*

(Continued)

*Primary Examiner*—Quyen Leung
*Assistant Examiner*—John K Kim
(74) *Attorney, Agent, or Firm*—McKenna Long & Aldridge LLP

(57) ABSTRACT

A motor includes a stator core that forms a magnetic path and has a plurality of tooth parts along a circumferential direction; a tooth provided in each tooth part to wind a coil there around; and an extension part alternated with the tooth part along a circumferential direction of the stator core, convexly extending to an inner radial direction.

7 Claims, 8 Drawing Sheets

U.S. PATENT DOCUMENTS

| | | | |
|---|---|---|---|
| 6,509,661 B1* | 1/2003 | Kujira et al. | 310/89 |
| 6,577,031 B2* | 6/2003 | Morooka et al. | 310/68 R |
| 6,674,195 B2* | 1/2004 | Yagyu et al. | 310/71 |
| 6,707,185 B2* | 3/2004 | Akutsu et al. | 310/71 |
| 6,873,076 B2* | 3/2005 | Kaeufl et al. | 310/91 |
| 6,894,412 B2* | 5/2005 | Han et al. | 310/112 |
| 7,021,418 B2 | 4/2006 | Tominaga et al. | |
| 7,291,951 B2* | 11/2007 | Takiguchi et al. | 310/75 R |
| 7,638,911 B2 | 12/2009 | Lee | |
| 2002/0030415 A1* | 3/2002 | Morooka et al. | 310/68 R |
| 2003/0006663 A1* | 1/2003 | Hsu | 310/194 |
| 2003/0107290 A1* | 6/2003 | De Filippis | 310/216 |
| 2004/0189120 A1* | 9/2004 | Takashima et al. | 310/89 |
| 2005/0040715 A1* | 2/2005 | Nesic | 310/71 |
| 2005/0167183 A1 | 8/2005 | Tominaga et al. | |
| 2005/0218749 A1* | 10/2005 | Shin et al. | 310/217 |
| 2005/0237663 A1* | 10/2005 | Nguyen | 360/97.01 |
| 2005/0264127 A1* | 12/2005 | Benkert et al. | 310/239 |
| 2006/0038452 A1* | 2/2006 | Lesak | 310/90 |
| 2006/0057002 A1* | 3/2006 | Nakanishi | 417/423.7 |
| 2006/0071574 A1* | 4/2006 | Stewart | 310/218 |
| 2006/0138883 A1* | 6/2006 | Yagai et al. | 310/71 |
| 2006/0208588 A1 | 9/2006 | Guttenberger | |
| 2006/0250043 A1* | 11/2006 | Chung | 310/216 |
| 2006/0279158 A1* | 12/2006 | Kim | 310/216 |
| 2008/0136278 A1 | 6/2008 | Lee | |
| 2008/0136287 A1* | 6/2008 | Lee | 310/218 |
| 2008/0137239 A1 | 6/2008 | Lee | |
| 2008/0169721 A1 | 7/2008 | Lee | |
| 2010/0156217 A1 | 6/2010 | Lee | |

FOREIGN PATENT DOCUMENTS

| | | |
|---|---|---|
| EP | 1 416 616 | 5/2004 |
| EP | 1 703 617 | 9/2006 |
| EP | 1 729 398 | 12/2006 |
| JP | 2000-050613 | 2/2000 |
| JP | 2003-250235 | 9/2003 |
| KR | 10-1999-0080680 | 11/1999 |
| KR | 10-2002-0088567 | 11/2002 |
| KR | 10-2004-0082193 A | 9/2004 |
| KR | 10-2005-0009687 | 1/2005 |
| KR | 10-2005-0104797 | 11/2005 |
| KR | 10-2006-0018704 A | 3/2006 |

OTHER PUBLICATIONS

Weizi Wang: Zhigna Wu: Wanbing Jin; Jianping Ying, "Starting methods for hall-less single phase BLDC motor", Industrial Electronics Society, 2005. IECON 2005. 32nd Annual Conference of IEEE Nov. 6-10, 2005 p. 4 pp.

* cited by examiner

MOTOR

This application claims the benefit of the Patent Korean Application Nos. 10-2006-0122998, 10-2006-0122999, 10-2006-0123000 and 10-2006-0123001 filed on Dec. 6, 2006, and all of which are hereby incorporated by reference as if fully set forth herein.

BACKGROUND OF THE INVENTION

1. Field of the Invention

The present invention relates to a motor, more particularly, to a motor easily fabricated and having enhanced efficiency and durability, which has a compact structure.

2. Discussion of the Related Art

Typically, a shading coil motor is incorporated into a refrigerator or a freezer as a fan motor. A shading coil, as well as, a main coil is wound around a stator in the shading coil motor.

The shading coil is configured to start a rotor. The shading coil, together with the main coil, forms an oval shaped magnetic field to start a rotor. When the rotor is rotating, the shading coil is not needed and causes electricity loss.

Moreover, auxiliary teeth should be provided to wind the shading coil around to make a shape of the stator assembly and the shading coil should be additionally wound around the teeth to make the winding assembly.

Since the shading coil motor uses a single phase alternating current to reduce the number of electric and electronic parts, the shading coil motor has an advantage of low cost. However, commonly the shading coil motor consumes and loses electricity a lot.

Also, it is difficult to control the shading coil motor and there is a further disadvantage of its large size.

Thus, demands for a motor, which can reduce electricity consumption with a compact exterior to be easily fabricated, have been increasing. The motor may not just operate a fan but also control the fan speed and torque.

SUMMARY OF THE INVENTION

Accordingly, the present invention is directed to a motor.

An advantage of the present invention is to provide a motor capable of being smoothly fabricated with a compact exterior by reducing a motor mounting space, such that the extent of motor applicability may be broad.

Another advantage of the present invention is to provide a motor which enhances efficiency to minimize electricity loss.

A further advantage of the present invention is to provide a motor which can control its rotational speed or torque to enhance reliability and durability.

More specifically, according to the present invention, cogging torque is reduced to enhance the efficiency of the motor such that the motor may be controlled more smoothly.

Additional advantages, and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a motor comprising: a stator core, which forms a magnetic path, having a plurality of tooth parts along a circumferential direction; a tooth provided in each of the plurality of tooth parts, such that a coil is wind around the tooth; and an extension part alternating between one of the plurality of tooth parts along a circumferential direction of the stator core, such that the extension part extends convexly in an inner radial direction.

In yet another aspect of the present invention, a motor comprising, a stator having stator core that forms a magnetic path; a plurality of tooth parts formed along a circumferential direction; a tooth provided in each of the plurality of the tooth parts in order to wind a coil around; an extension part alternating between one of the plurality of tooth part along a circumferential direction of the stator core, such that the extension part extends convexly to an inner radial direction, wherein the extension part is formed on every portion of the stator core between two neighboring tooth parts; and a rotor provided within the stator having at least one permanent magnet provided along an outer circumferential surface of the rotor in order to form alternative magnetic poles.

It is to be understood that both the foregoing general description and the following detailed description of the present invention are exemplary and should not be construed as limiting the scope of the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same like parts.

Figure 1:
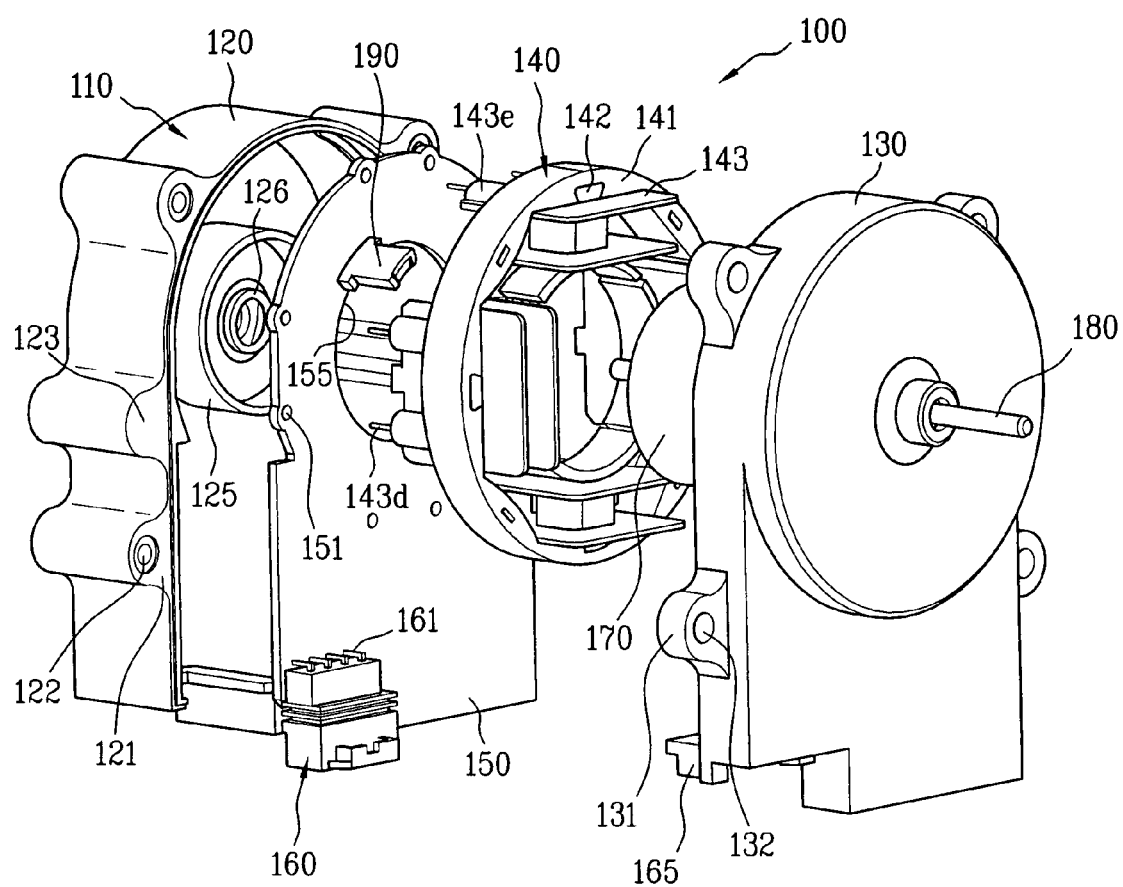
FIG. 1 is an exploded perspective view illustrating a motor of the present invention.

FIG. 1 is an exploded perspective view of a motor 100 according to the present invention.

As shown in FIG. 1, a motor 100 of the present invention includes a bracket 110, a printed circuit board (PCB)150, a stator 140, a rotor 170 and a shaft 180. The bracket 110 defines an exterior of the motor. The PCB 150 is held within the bracket 110 and an electric pattern (not shown). Also, various elements (not shown) are mounted on the PCB 150.

The bracket 110 includes a lower bracket 120 and an upper bracket 130. The lower and upper brackets 120 and the 130 are coupled to each other to hold various components therebetween. To couple the lower and upper brackets 120 and 130 to each other, a fastening boss 122 and 132 may be fastened to a fastening hole 121 and 131 formed on the fastening boss 122 and 132 by, for example, a screw (not shown).

Figure 5:
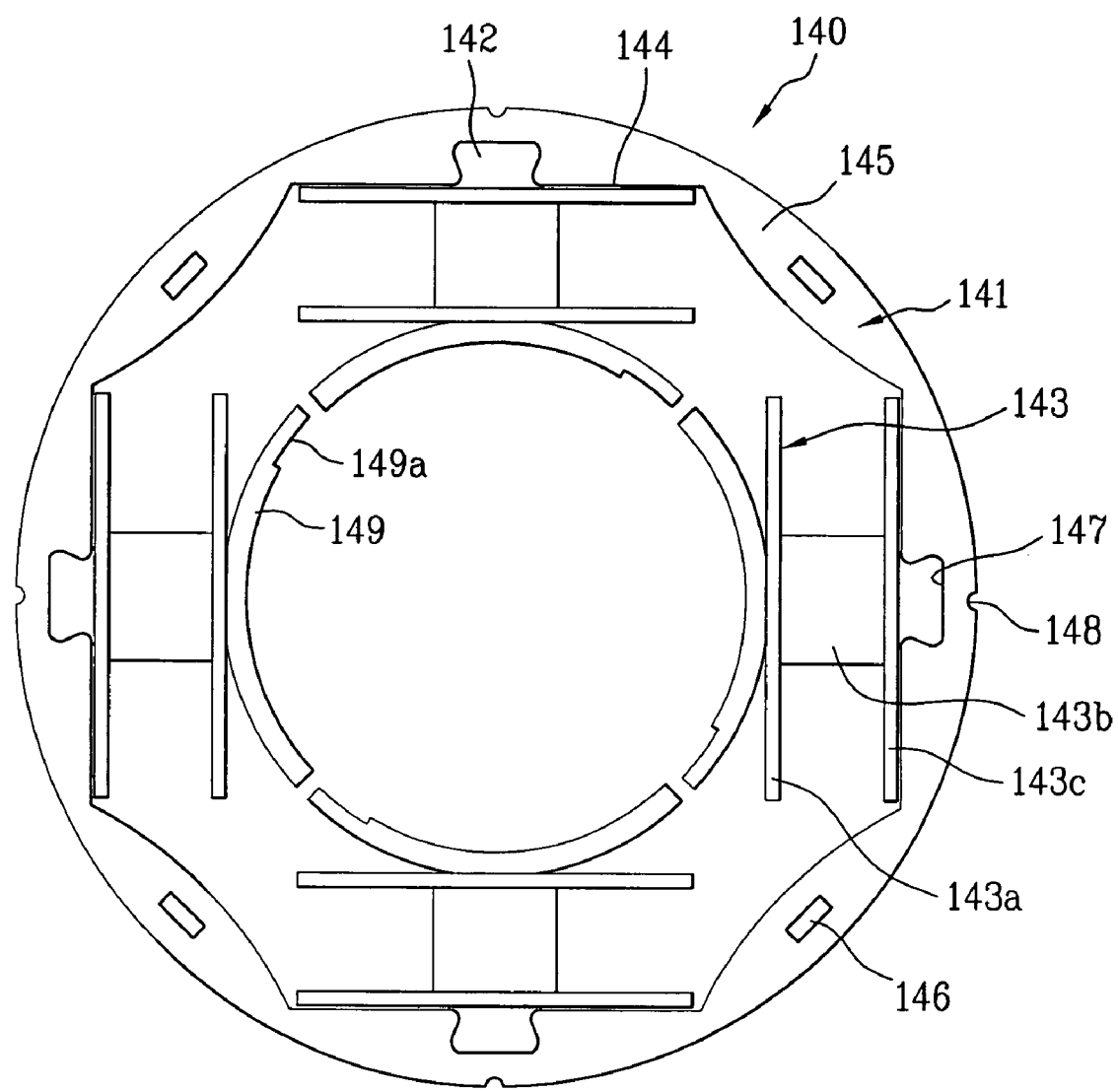
FIG. 5 is a plane view illustrating a stator of FIG. 1.

Referring to FIGS. 1 and 5, the stator 140 of the motor according to the present invention will be described in detail.

The stator 140 includes a stator core 141 and a tooth 142.

As shown in the above drawings, the stator core 141 may be formed in a circular shape and forms a magnetic path. The tooth 142 is projected in a radial direction of the stator core 141 and a coil is wound around the tooth 142. The motor 100 shown in the drawings is embodied as an inner rotor type motor in which a rotor 170 is provided within a stator core 141. Thus, the tooth 142 is projected inwardly in a radial direction. A plurality of teeth 142 may be formed and FIG. illustrates an embodiment in which four teeth 142 are formed.

A plurality of tooth parts 144 are alternated with a plurality of extension parts 145 along an inner circumferential direction of the stator core 141. The teeth 142 are provided on the tooth parts 144, respectively.

The extension part 145 extends inwardly and in a convex direction between the two neighboring tooth parts 144 in a radial direction. In an embodiment, the extension part 145 increases its thickness entirely to secure enough space needed in forming a magnetic flux. Thereby, a leakage flux due to a high saturation of flux density is minimized to maximize an efficiency of the motor and the thickness of the stator core 141 increases to reinforce a structural strength of the stator core 141.

Alternatively, the extension part 145 may be formed outwardly in a radial direction. However, this scenario may enlarge the size of the stator core 141 which would also enlarge the entire size of the motor.

Therefore, the stator core 141 may be formed by multi-layering a plurality of unit stator cores. That is, a plurality of thin unit stator cores may be multi-layered to form a stator core 141 having a predetermined height. The stator core 141 is formed by multi-layered unit stator cores may minimize a leakage flux, which might be formed in a perpendicular direction of the magnetic flux, to enhance efficiency of the motor. The teeth 142 may also be formed by a multi-layering method.

If the stator core 141 is formed by a multi-layering the unit stator cores, 141 the stator cores 141 should be fastened to each other as one body. That means that the one stator core 141 formed as one body is necessary. Thus, a caulking part 146 should be provided to fasten the stator cores 141 to each other. The caulking part 146 is formed on the stator core 141. More specifically, a portion having a wide width. The caulking part 146 passes through an upper and lower part of the stator core 141 to minimize a leakage flux or a fringing flux due to the caulking part 146.

According to the present invention, the caulking part 146 may be formed on the extension part 145. For example, the caulking part 146 may be formed on a center of the extension part 145, which has the widest width.

Thereby, it is possible to perform secure caulking. The caulking part 146 minimizes distortion of the stator core 141 and prevents efficiency deterioration.

Meanwhile, the teeth 142 may be integrally formed with the stator core 141, that is, the teeth 142 may be formed as one body with the stator core 141. Alternatively, the teeth 142 may be formed separately from the stator core 141 and fastened to the stator core 141 to ease the fabrication of the stator 140 as well as winding.

A tooth slot 147 may be formed in a center of the tooth part 144 formed on the stator core 141 and an end of the tooth 142 is inserted in the tooth slot 147 to fasten the tooth 142 to the stator core 141.

Thus, a tooth 142 may be inserted in a bobbin 143 and a coil is wound around the bobbin 143 to insert the tooth 142 in the tooth slot 147, such that the fastening between the bobbin 143 and the tooth 142 and winding may be smooth.

Next, a groove 148 may be formed on an outer circumferential surface of the stator core 141 in a substantially longitudinal direction of the stator core 141. In an embodiment, a plurality of grooves 148 may be formed along a circumferential direction of an outer surface of the stator core 141.

The groove 148 also helps the unit stator cores to separate from a blanking mold when the unit stator cores are blanked and molded. More specifically, the groove 148 causes the internal pressure of the mold to be the same as the external pressure in order to smoothly separate the unit stator cores from the mold. Furthermore, the groove 148 guides the unit stator cores.

In an exemplary embodiment, the groove 148 may be formed on an outer portion of the tooth slot 147 formed on the stator core 141 to minimize variation of core size caused when the tooth 142 is inserted in the tooth slot 147. Thus, to perform this function, the groove 148 may correspond to a center of the tooth slot 147.

According to the present invention, that a coil is wound around the bobbin 143 configured for insulation and winding between a coil and the tooth 142 without any difficulties, instead of directly winding a coil around the tooth 142.

The bobbin 143 may be configured as an inner wall 143a, a winding part 143b and an outer wall 143c. A coil is wound around the winding part 143b between the inner wall 143a and the outer wall 143c, and the inner wall 143a and the outer wall 143c prevent the coil from coming outside.

Here, the outer wall 143c of the bobbin 143 contacts with the tooth part 144 provided on the stator core 141. In an embodiment, an inner wall of the tooth part 144 is a plane to be contacted with the outer wall 143 of the bobbin 143, such that the bobbin 143 may be coupled to the stator core 141 more securely.

By way of example, the motor of the present invention may have four teeth 142. Hence, if the power is applied to the coil wound around the tooth 142, an N-pole and an S-pole are alternatively formed on each tooth 142. As shown in FIG. 5, if an N-pole is formed on a tooth 142 provided at upper most position, an S-pole is formed on the neighboring teeth 142.

Polarity is formed on the teeth 142 and a leakage flux increases as the distance between the teeth is getting farther and farther. Thus, a pole shoe 149 may be formed on a front end of each tooth 142 to minimize a leakage flux and is extended a predetermined length in both opposite circumferential directions to be fixedly contacted with an outer surface of the rotor 170. Thereby, a leakage flux caused between the two neighboring teeth 142 may be minimized.

As shown in FIG. 5, the pole shoe 149 formed on one tooth 142 may not be connected to the next pole shoe 149 formed another neighboring tooth 142. This is because two different polarities are formed on two neighboring pole shoes 149, respectively. If the two neighboring pole shoes 149 are connected, polarity may deteriorate.

Together with the pole shoe 149 formed to minimize a leakage flux, cogging torque or torque ripple generated from the shaft 180 and the rotor 170 by drastic change of polarity between teeth is reduced. This is because the cogging torque makes the control of motor difficult and causes vibration or noise.

Accordingly, it is preferred to smooth down the drastic change of polarity between the two neighboring teeth.

Figure 8:
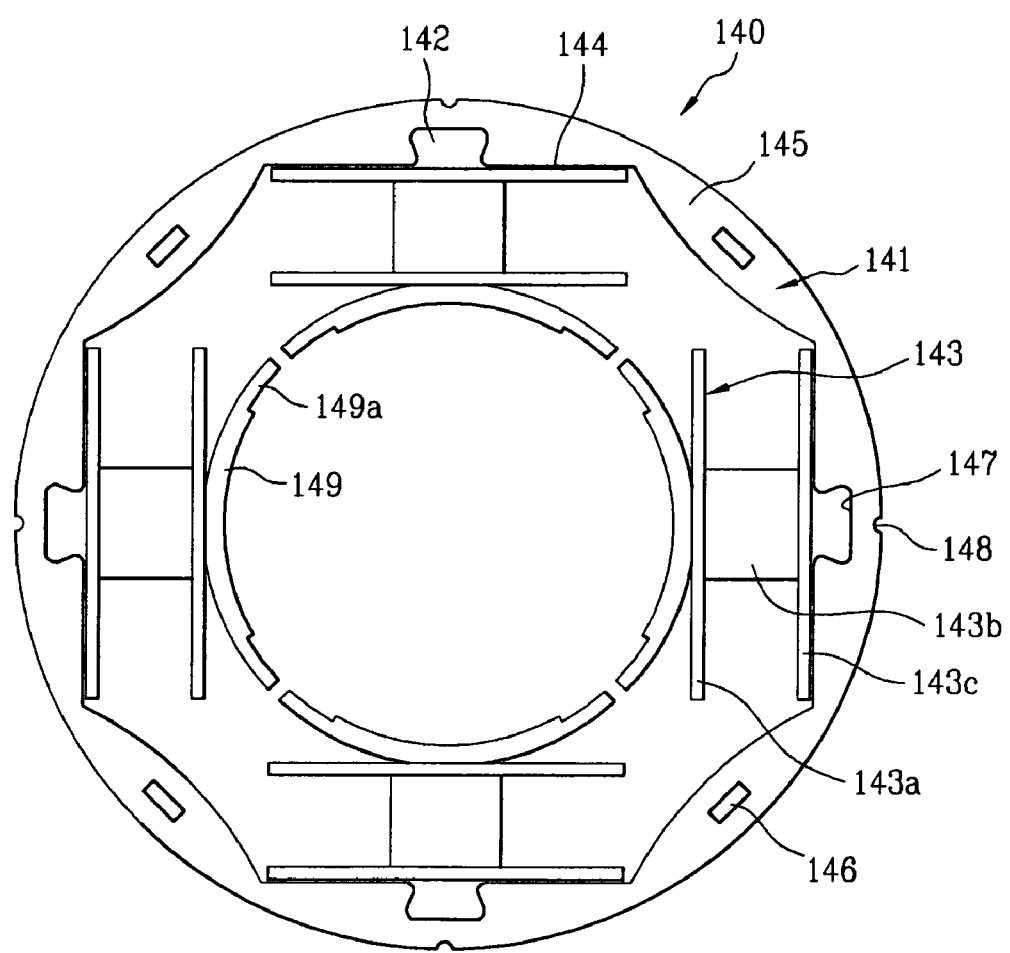

According to the present invention, a cut part 149a may be formed at both opposite ends, as shown in FIG. 8, or at an end of the pole shoe 149 to minimize the cogging torque. Flux density is reduced by the cute part 149a to prevent the polarity from changing drastically. Also, a flux leakage may be large due to the cut part 149a. Thus that the cut part 149a may be formed at only one pole 149.

Preferably, the cut part 149a is formed at an end of the pole shoe 149 in a substantially longitudinal direction to have a width more narrow than the other portions of the pole shoe 149.

Figure 4:
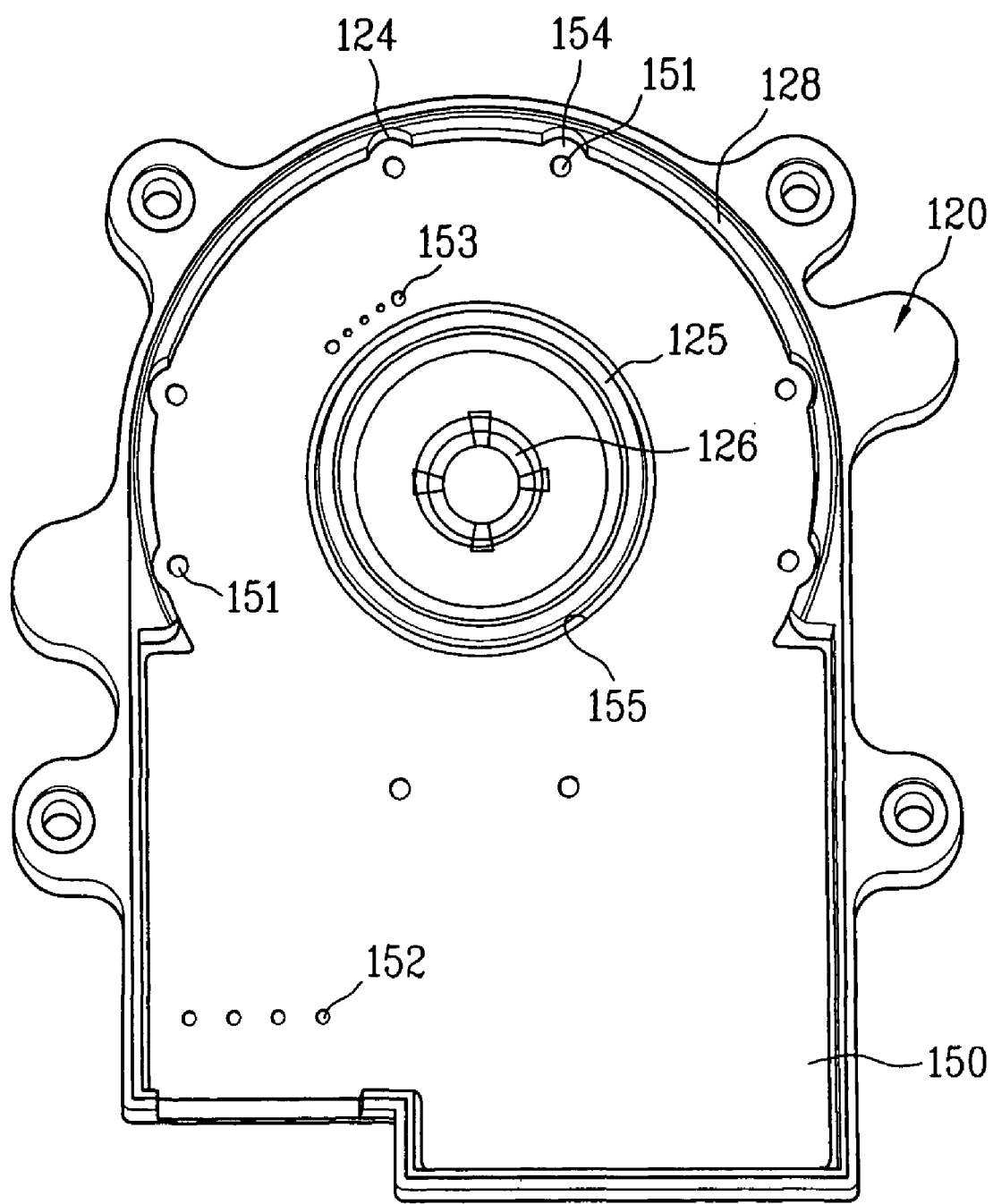
FIG. 4 is a plane view illustrating a lower bracket of FIG. 1 fastened to a PCB.

Next, referring to FIGS. 1 and 4, the PCB 150 of the motor according to the present invention will be described in detail. Here, FIG. 4 is a plane view illustrating that the PCB 150 is mounted on a lower bracket 120.

As shown in FIGS. 1 and 5, a stator 140 of the motor according to the present invention may be formed in a circular shape. Corresponding to the shape of the stator 140, at least some portion of the PCB 150 may be formed in a circular shape. As shown in FIG. 1 and 4, an upper portion of the PCB 150 may be formed in a circular shape, where the stator 140 is seated.

A radius of the circular portion of the PCB 150 may be substantially the same as that of the stator core 141. A large sized exterior of the PCB 150 may enlarge the size of the bracket 110. Hence, the entire size of the motor may be large. Accordingly, some portion of the PCB 150 may be formed in a circular shape to provide a more compact sized motor.

Fin 143d is formed on both lower opposite sides of the bobbin 143. The fin 143d is electrically connected to the coil wound around the bobbin 143. Thus, the fin 143d is inserted in a hole 151 formed on the PCB 150 to connect the PCB 150 to the coil. Once the fin 143d is inserted in the hole 151 of the PCB 150, soldering may be performed for secure electrical connection.

The fin 143d helps the stator 140 seated on an upper portion of the PCB 150 by using the bobbin 143, as well as electrically connects the PCB 150 to the coil. Thus, the fin 143d is formed on the boss 143e to enlarge a contact section with the PCB 150 and to carry the weight of the stator 140.

The boss 143e is formed in a lower portion of the outer wall 143c to maintain a distance between the PCB 150 and the stator core 141.

A connector 160 is provided in a side of the PCB 150. A fin 161 is formed on an end of the connector 160 and the connector 160 is fixed to the PCB 150 through the fin 161, electrically connected to the PCB 150 the fin 161 is inserted in a hole 152 formed on the PCB 150 and the other end of the connector 160 is exposed outside of the motor, that is outside of the bracket 110, to be connected to an external power.

Furthermore, a hall sensor 190 is provided on a portion of the PCB 150 corresponding to the position of the rotor 170. The hall sensor assembly 190 senses a rotation position or a rotational speed of the rotor 170 to control a rotation speed or torque of the rotor 170. Thus, a hole 153 is formed on the PCB 150 to fix the hall sensor assembly 190 and to electrically connect the hall sensor assembly 190 to the PCB 150.

Since the four teeth 142 are provided in the motor of the present invention, four portions to which four bobbins 143 are coupled are provided.

As shown in FIGS. 1 and 4, some portion of the PCB 150 is formed in a circular shape. A predetermined number of the four portions are formed on a circular shaped portion of the PCB 150. As described above, this circular shaped portion is corresponding to the circular shape of the stator 140.

Also, a predetermined number of holes 151 may be formed on an outermost portion of the circular shaped PCB portion. That is, a predetermined number of holes 151 may be formed on a circumference of the PCB 150.

In an embodiment, an extension part of the PCB 154 is extended outwardly on a portion where hole 151 is formed. In other words, the extension part 154 secures a predetermined distance between the holes 151 and the outermost portion of the PCB 150, such that the strength of the PCB 150 is reinforced and the external shape of the PCB 150 is prevented from getting large. Furthermore, the extension part 154 enables the PCB 150 seated on the bracket 10 smoothly.

A hollow ring 155 is formed on the PCB 150. The hollow ring 155 may be formed on a center of the PCB 150 and a stopper, which will be described later, is inserted in the hollow 155 to prevent interference between the rotor 170 and the PCB 150.

Also, since the stopper is inserted in the hollow 155, the PCB 150 may be securely fixed to the bracket 110.

Next, referring to FIGS. 2 and 3, the bracket 110 of the motor according to the present invention will be described in detail.

As mentioned before, the bracket 110 of the present invention includes a lower bracket 120 and an upper bracket 130 coupled to each other to hold various components. The lower bracket 120 may include a mounting part 123 that mounts the motor 100 to various parts the motor applied to.

The shape of the bracket 110 corresponds to that of the PCB 150. The PCB 150 is seated within the bracket 110, more specifically within the lower bracket 120.

A groove 124 corresponding to the extension part 154 may be formed on the lower bracket to seat the extension part 154 therein. This can make the position of the PCB 150 automatically adjusted when the PCB 150 is seated on the lower bracket 120, even more securely.

A step part 128, which will be described later, is formed on the lower bracket 120 to mount the stator to the lower bracket 120. The step part 128 is projected a predetermined distance from an inner wall of the lower bracket 120. Preferably, the groove 124 cuts some portion of the step part 128 to prevent the shape of the bracket large due to the groove 124.

Figure 2:
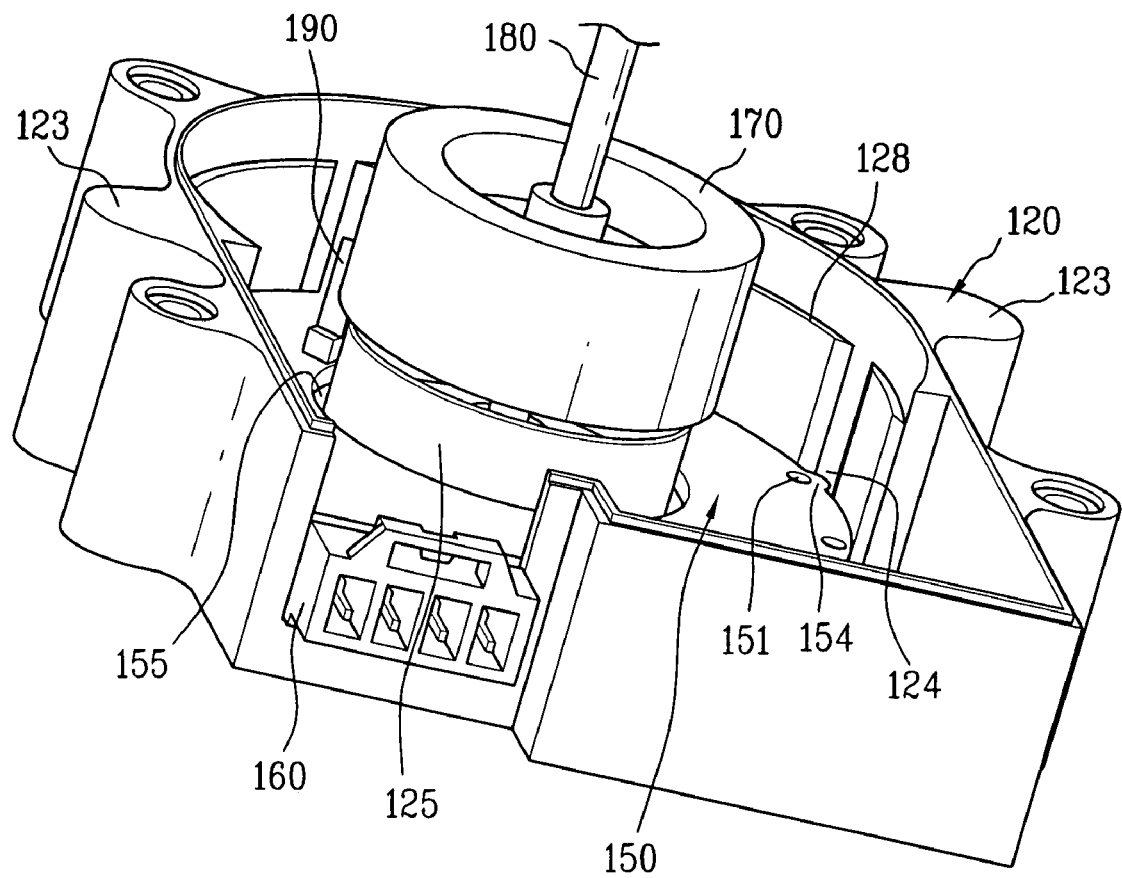
FIG. 2 is a perspective view illustrating parts of the motor shown in FIG. 1 as assembled.
Figure 3:
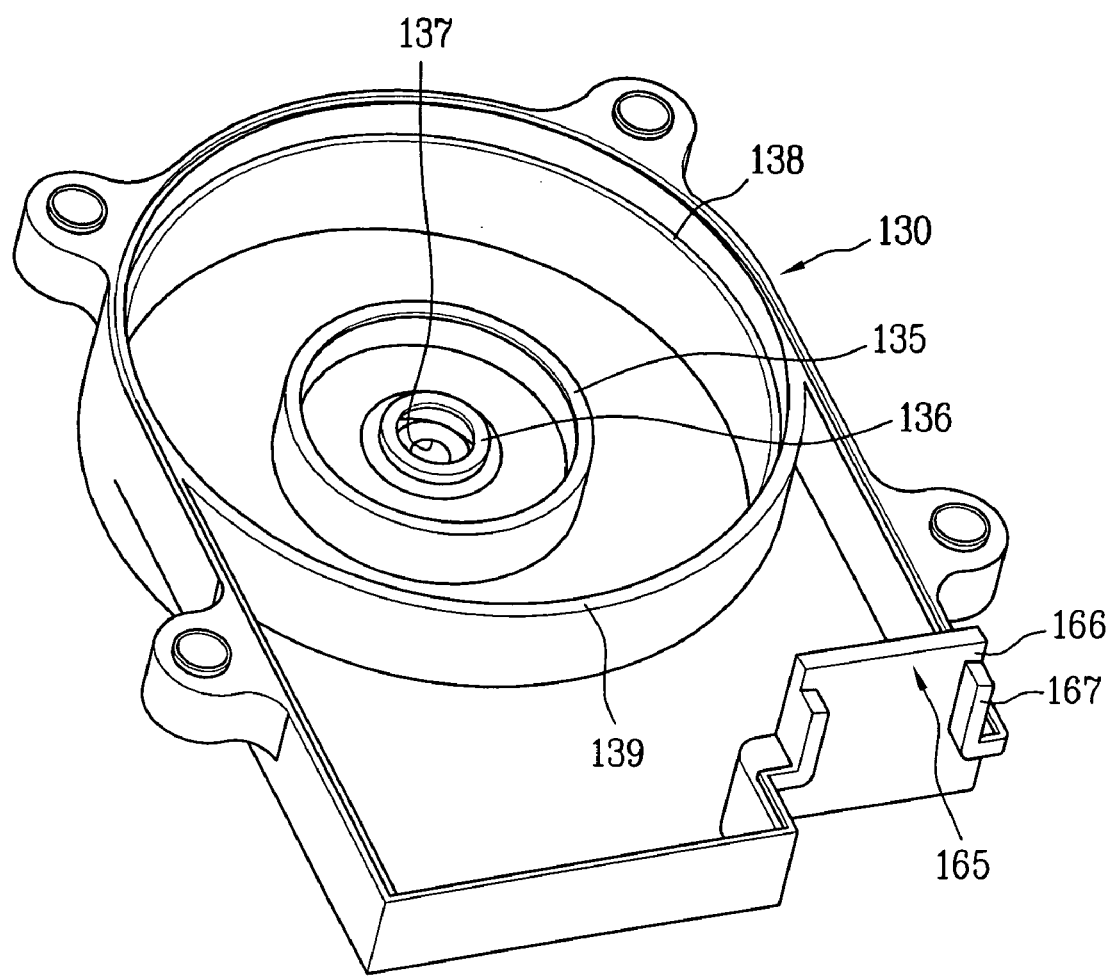
FIG. 3 is a perspective view illustrating a down surface of an upper bracket shown in FIG. 1.

As shown in FIG. 2, the PCB 150 is mounted within the lower bracket 120. As described above, a stopper 155 is inserted in a hollow 155 formed on the PCB 150.

Hence, the stator 140 is partition on the PCB 150, and the rotor 170 and the shaft 180 is provided within the stator 140.

An end of the shaft 180 is rotatably supported by the bearing 126 provided in the lower bracket 120 and a thrust is supported. The other end of the shaft 180 is rotatably supported by the bearing 136 provided in the upper bracket 120. Here, the shaft is exposed outside through the through hole 137 to drive a load.

As shown in FIG. 2, the shaft 180 is inserted in the rotor 170 to rotate as one body with the rotor 170, such that the rotor 170 is prevented from moving in a longitudinal direction of the shaft 180.

Due to those problems, a stopper 125 may be formed to prevent the rotor 170 from moving toward the shaft 180. The stopper 125 may be projected to an inside of the bracket and may be formed as one body with the bracket The stopper 125 formed as one body with the lower bracket is shown in FIGS. 1 and 2.

A stopper 135 may be formed in the upper bracket 130 as one body with the upper bracket 130, too. The rotor 170 may be provided between the both stoppers 125 and 135.

Thus, the stopper 125 and 135 can prevent from interference with the bracket 110 and the PCB 150 even though the rotor 170 might move toward the shaft 180.

The stoppers 125 and 135 may be projected in a cylindrical shape. This is because it is preferred that the stopper corresponds to the shape of the rotor 170. Also, an upper surface of the stopper 125 and 135 is contacted with an upper or lower surface of the rotor 170.

According to the motor of the present invention, the stator 140 is securely fixed within the bracket 110. For this, a step part 128 and 138 is formed on a lower and upper bracket 120 and 130, respectively.

The stator 140, more specifically an outer circumferential surface of the stator core 141, is seated on the step part 128 and 138. Hence, as the upper bracket 130 is coupled to the lower bracket 120, the stator 140 is securely fixed between the step parts 128 and 138.

Since the PCB 150 has been already seated on the lower bracket 120, it is difficult to form the step part 128 corresponding to the entire circumference of the stator core 141. Thus, the step part 138 may be formed corresponding to the entire circumference of the stator core 141. For this, it is preferred that an inner partition wall 139 is further formed within the upper bracket 130.

Alternatively, an inner partition wall may be formed in the lower bracket, too. If then, a through hole (not shown) should be formed on the PCB 150 so that the inner partition wall may pass there through, thereby not preferred.

Next, referring to FIGS. 6 and 7, a connector for power connecting of the motor will be described.

Figure 6:
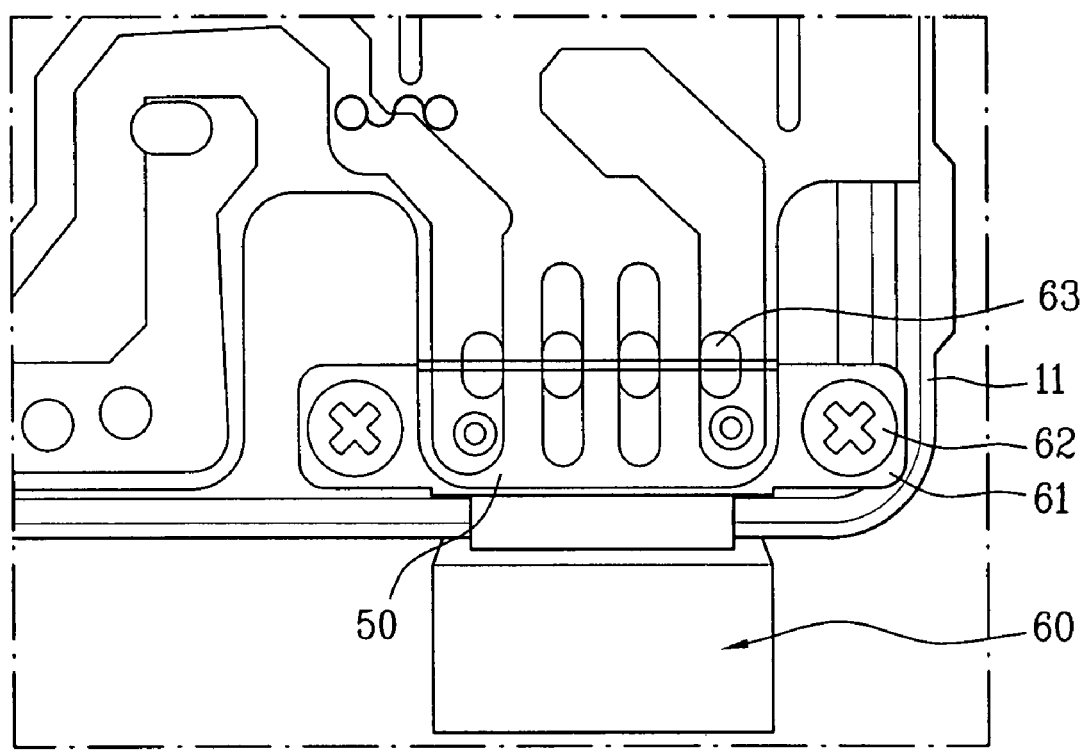
FIG. 6 is a plane view partially illustrating a fixing structure of a related art connector for power connection.
Figure 7:
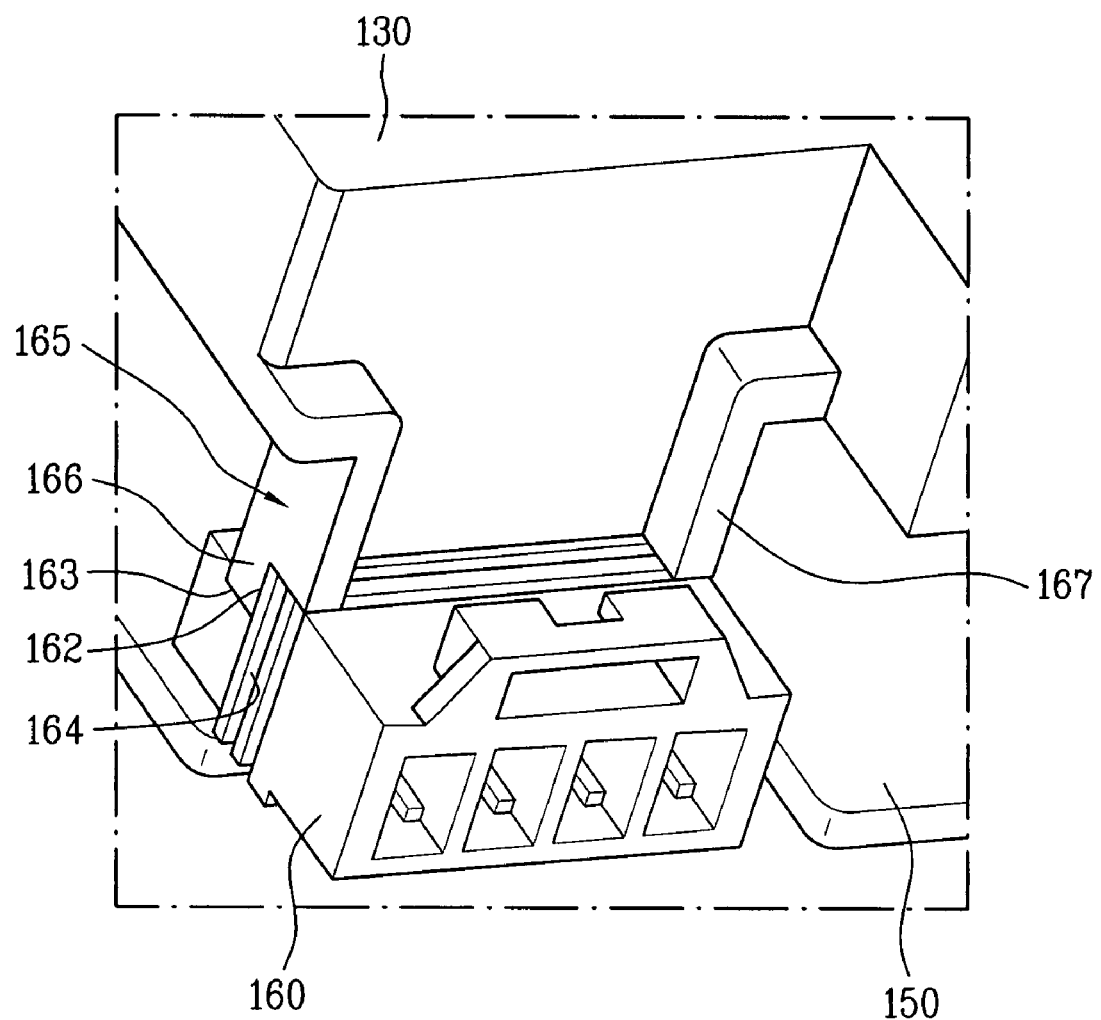
FIG. 7 is a perspective view partially illustrating a fixing structure of a connector for power connection according to the motor of the present invention.

FIG. 6 is a front view illustrating a fixing structure of a related art connector and FIG. 7 is a partial perspective view illustrating a fixing structure of a connector according to the present invention.

More specifically, the connector 60 supplies power to the PCB 50. An end of the connector 60 is connected to the PCB 50 and the other end of the PCB 50 is exposed outside of the bracket to be connected to an external power.

Here, the other end of the connector 60 is connected to an external power via a plug (not shown) and the connector 60 is subject to a force when the plug is connected or separated.

The force may be a pushing force which pushes the connector 60 into the bracket or a pulling force which pulls the connector 60 outside of the bracket. Thus, the external force which influences the connection part between the PCB 50 and the connector 60 has to be shut off.

A wing part 61 extends in both opposite sides of the related art connector's center, respectively. An opening (not shown) s formed on the wing part 61. Also, a boss (not shown) having a fastening hole corresponding to the opening is formed on the bracket 11.

Thus, once the connector 60 is connected to the PCB 50, the wing part 61 of the connector 60 is fastened to the boss of the bracket 11 through a screw 62. Since the wing part 61 supports an external force, the connection part between the connector 60 and the PCB 50 may be prevented from damaging.

As shown in FIG. 6, the portion of the PCB 50 where the wing part 61 is formed should be cut. Also, an auxiliary screw fastening is needed to cause deteriorate productivity if motors should be fabricated in mass. There is a problem that the number of necessary parts increases, as well.

Therefore, according to the motor of the present invention, the motor further includes a reinforcing part formed as one body with the upper bracket or the lower bracket to reinforce a fixing strength of the connector 160 as the upper bracket is coupled to the lower bracket.

That is, an auxiliary part such as a screw need not be provided to reinforce the fixing strength of the connector 160 and the coupling of the upper and lower bracket may automatically reinforce the fixing strength, thereby allowing a smooth fabrication process.

FIG. 7 illustrates that a reinforcing part is formed as one body with an upper bracket.

The reinforcing part 165 is a side wall of the upper bracket 130 and includes a projection rib 166 projected toward the connector 160. Alternatively, the projection rib 166 may be separate from a side wall of the upper bracket 130.

A stepped part 162 may be formed on the connector 160 for the projection rib 166 to be contacted. Since the projection rib 166 is contacted with the step part 162, an external force generated from the connector 60 may be supported.

The contacting process between the projection rib 166 and the step part 162 is performed simultaneously together with the coupling process between the upper and lower bracket. Thereby, the conventional process of screw fastening may be omitted.

The step part 162 supports only the force which pushes the connector 160 into the bracket. Thus, the step part 162 may be formed as a groove part 163 to support the force which pulls connector 160 outside of the bracket 110, as well. The projection rib 166 is inserted in the groove part 163 to support the force of both directions.

The reinforcing part 165 may further include a reinforcing rib 167 to reinforce the strength of the projection rib 166. The reinforcing rib 167 may be formed on an inner and outer portion of the bracket, respectively.

Alternatively, the reinforcing rib 167 may be perpendicular to the projection rib 166. Here, it is preferred that some portion of the reinforcing rib 167 is contacted with an upper surface of the connector 160. This is because the connector 160 can be securely fixed by the increase of the section in contact with the upper bracket 130 and the connector 160.

Furthermore, a groove 164 may be formed on an outer circumferential surface of the connector 160 in a horizontal direction to securely fix the connector 160.

Some portion of the lower bracket 120 is inserted in the groove 164 to reinforce the fixing strength of the connector.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A motor comprising:
    a bracket having an upper and lower bracket coupled with each other to define an exterior of the motor;
    a printed circuit board (PCB) mounted within the lower bracket, the PCB having a hollow formed on a center thereof, a circular external shape corresponding to the circular external shape of the stator and an extension part outwardly formed at the circular external shape, wherein an external shape of the bracket corresponds to the circular external shape of the PCB;
    a stator comprising a bobbin provided at a tooth for winding a coil around, the stator being mounted on the PCB;
    a rotor provided within the stator, wherein the PCB is electrically connected to the coil through a fin formed at the bobbin and the fin is inserted into a hole formed at the extension part of the PCB; and
    a connector having an end electrically connected to the PCB and an other end exposed outside of the bracket to be connected to an external power, the connecter having a step, wherein the connector is provided within the upper and lower bracket and a projection rib projected toward the connector contacts with the step of the connector, as the upper and lower brackets are coupled.

2. The motor of claim 1, wherein the step is formed as a groove and the projection rib is inserted in the groove.

3. The motor of claim 2, wherein the projection rib is formed as one body with the upper bracket or the lower bracket.

4. The motor of claim 1, wherein a groove is formed on the lower bracket to seat the extension part.

5. The motor of claim 4, wherein a step part is formed on the lower bracket to mount the stator, the step part being projected a predetermined distance from an inner wall of the lower bracket.

6. The motor of claim 5, wherein the groove is some cut portion of the step part.

7. The motor of claim 4, further comprising a stopper that projects from an inside of the lower bracket and is inserted in the hollow to prevent interference between the rotor and the PCB.

* * * * *